(12) United States Patent
Huang et al.

(10) Patent No.: US 11,323,141 B2
(45) Date of Patent: May 3, 2022

(54) CONTROL METHOD OF MULTI-ANTENNA MODULE

(71) Applicant: GIGA-BYTE TECHNOLOGY CO., LTD., New Taipei (TW)

(72) Inventors: Ching-Hsun Huang, New Taipei (TW); Tse-Hsien Liao, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/202,261

(22) Filed: Mar. 15, 2021

(65) Prior Publication Data

US 2021/0377874 A1    Dec. 2, 2021

(30) Foreign Application Priority Data

May 29, 2020 (TW) .................................. 109117952

(51) Int. Cl.
| | |
|---|---|
| *H04B 1/00* | (2006.01) |
| *H04B 17/27* | (2015.01) |
| *H04B 7/08* | (2006.01) |
| *H04W 52/28* | (2009.01) |
| *H04B 7/06* | (2006.01) |

(52) U.S. Cl.
CPC ......... *H04B 1/0064* (2013.01); *H04B 7/0691* (2013.01); *H04B 7/0874* (2013.01); *H04B 17/27* (2015.01); *H04W 52/283* (2013.01)

(58) Field of Classification Search
None
See application file for complete search history.

(56) References Cited

U.S. PATENT DOCUMENTS 9,083,074 B2 *   7/2015  Ayatollahi ............. H01Q 1/243
10,484,075 B1 * 11/2019  Maheshwari ......... H04W 88/06
(Continued)

FOREIGN PATENT DOCUMENTS

KR     20100037666     4/2010
TW         588520      5/2004
(Continued)

OTHER PUBLICATIONS

"Office Action of Taiwan Counterpart Application", dated Apr. 15, 2021, p. 1-p. 5.
(Continued)

*Primary Examiner* — Gennadiy Tsvey
(74) *Attorney, Agent, or Firm* — JCIPRNET (57) ABSTRACT

A control method of a multi-antenna module includes the following. Antennas generating signals in at least a first frequency band and a second frequency band are provided. The antennas are divided into a first group and a second group by detecting performance of the antennas in the first frequency band and the second frequency band. Antennas of the first group have better performance in the first frequency band than in the second frequency band, and antennas of the second group are antennas other than the antennas of the first group. The number of the antennas of each of the first group and the second group is at least greater than or equal to 2. The first group is instructed to generate the signals in the first frequency band, and the second group is instructed to generate the signals in the second frequency band.

10 Claims, 4 Drawing Sheets

(56) References Cited

U.S. PATENT DOCUMENTS

| | | | |
|---|---|---|---|
| 2012/0021693 A1* | 1/2012 | Wintzell | H04W 24/10 |
| | | | 455/67.11 |
| 2015/0017929 A1* | 1/2015 | Ljung | H04B 7/0811 |
| | | | 455/73 |
| 2017/0070246 A1* | 3/2017 | Natesan | H04B 1/0458 |
| 2017/0149477 A1* | 5/2017 | Zhu | H04B 7/0825 |
| 2018/0294547 A1* | 10/2018 | Park | H01Q 1/241 |
| 2019/0020121 A1 | 1/2019 | Paulotto et al. | |
| 2019/0123786 A1* | 4/2019 | Lee | H04B 1/0064 |
| 2019/0165454 A1* | 5/2019 | Lee | H01Q 1/243 |
| 2019/0190583 A1* | 6/2019 | Natarajan | H04B 7/0874 |
| 2019/0199414 A1 | 6/2019 | Hogberg et al. | |
| 2019/0237873 A1* | 8/2019 | Sazegar | H01Q 21/29 |
| 2019/0296789 A1* | 9/2019 | Yu | H04B 1/401 |
| 2020/0091989 A1* | 3/2020 | Ashiwal | H04B 7/0404 |
| 2020/0106192 A1* | 4/2020 | Avser | H01Q 5/28 |
| 2021/0218158 A1* | 7/2021 | Kim | H01Q 21/28 |
| 2021/0227542 A1* | 7/2021 | Li | H04W 72/0453 |
| 2021/0288401 A1* | 9/2021 | Lee | H01Q 1/243 |

FOREIGN PATENT DOCUMENTS

| | | |
|---|---|---|
| TW | 201526568 | 7/2015 |
| TW | 201540121 | 10/2015 |
| WO | 2019143727 | 7/2019 |

OTHER PUBLICATIONS

"Search Report of Europe Counterpart Application", dated Oct. 1, 2021, p. 1-p. 8.
Office Action of Korean Counterpart Application, with English translation thereof, dated Dec. 9, 2021, pp. 1-8.

* cited by examiner

CONTROL METHOD OF MULTI-ANTENNA MODULE

CROSS-REFERENCE TO RELATED APPLICATION

This application claims the priority benefit of Taiwan application serial no. 109117952, filed on May 29, 2020. The entirety of the above-mentioned patent application is hereby incorporated by reference herein and made a part of this specification.

BACKGROUND

Technical Field

The disclosure relates to a control method, and particularly relates to a control method of a multi-antenna module.

Description of Related Art

Through the progress of wireless technologies, electronic devices with multiple antennas have been quite common. Meanwhile, how to configure multiple antennas to provide favorable performance remains an issue to work on.

SUMMARY

Embodiments of the disclosure provide a control method of a multi-antenna module capable of generating signals of multiple frequency bands.

A control method of a multi-antenna module according to an embodiment of the disclosure includes the following. A plurality of antennas are provided. The antennas at least generate signals in a first frequency band and signals in a second frequency band. The antennas are divided into a first group and a second group by detecting performance of the antennas in the first frequency band and the second frequency band. Antennas of the first group have better performance in the first frequency band than in the second frequency band, and antennas of the second group are antennas other than the antennas of the first group. The number of the antennas of each of the first group and the second group is at least greater than or equal to 2. The first group is instructed to generate the signals in the first frequency band, and the second group is instructed to generate the signals in the second frequency band.

According to an embodiment of the disclosure, the control method further includes: operating, under an optimal setting, two of the antennas which have optimal antenna efficiencies, setting 30% to 50% of the optimal setting as an initial ratio, operating a plurality of remaining antennas of the antennas at a plurality of ratios with arithmetic increases from the initial ratio, and measuring a plurality of antenna efficiencies of the remaining antennas operating at the ratios to choose an optimized ratio from the ratios; and operating the remaining antennas at the optimized ratio.

According to an embodiment of the disclosure, choosing the optimized ratio from the ratios includes: comparing the antenna efficiencies corresponding to the ratios from a smaller value to a greater value. When an increase of one of the antenna efficiencies from a previous one is less than a default value, the ratio corresponding to the one of the antenna efficiencies is set as the optimized ratio.

According to an embodiment of the disclosure, the control method further includes: operating, at a default ratio, two of the antennas which have optimal antenna efficiencies, the default ratio being 70% to 100%, operating a plurality of remaining antennas of the antennas at a plurality of ratios with arithmetic decreases from the default ratio, and measuring a plurality of antenna efficiencies of the remaining antennas operating at the ratios to choose an optimized ratio from the ratios; and operating the remaining antennas at the optimized ratio.

According to an embodiment of the disclosure, choosing the optimized ratio from the ratios includes: comparing the antenna efficiencies corresponding to the ratios from a greater value to a smaller value. When a decrease of one of the antenna efficiencies from a previous one is greater than a default value, the ratio corresponding to the one of the antenna efficiencies is set as the optimized ratio.

According to an embodiment of the disclosure, the antennas are located in a casing of an electronic device and serve as a plurality of internal antennas, and the internal antennas are located at a plurality of corners in the casing.

According to an embodiment of the disclosure, the control method further includes: providing a plurality of external antennas located outside the casing and at least generating signals in the first frequency band and signals of the second frequency band; determining whether a person or an object is approaching the casing; and upon receipt of an approaching signal, operating the external antennas under an optimal setting, and operating the internal antennas under a lower setting.

According to an embodiment of the disclosure, operating the internal antennas under the lower setting includes: setting 30% to 50% of the optimal setting as an initial ratio, operating the internal antennas at a plurality of ratios with arithmetic increases from the initial ratio, and measuring a plurality of antenna efficiencies of the internal antennas operating at the ratios to choose an optimized ratio from the ratios; and operating the internal antennas at the optimized ratio.

According to an embodiment of the disclosure, operating the internal antennas under the lower setting includes: operating the internal antennas at a plurality of ratios with arithmetic decreases from a default ratio, and measuring a plurality of antenna efficiencies of the internal antennas operating at the ratios to choose an optimized ratio from the ratios, the default ratio being 70% to 100%; and operating the internal antennas at the optimized ratio.

According to an embodiment of the disclosure, determining whether the person or the object is approaching the casing includes: detecting whether the person or the object is approaching the casing by using at least one of an optical detection module, a sound reception module, a distance detection module, and a peripheral module. The optical detection module includes a human face recognition system or an infrared module. The sound reception module includes a microphone. The distance detection module includes an ultrasonic detection module. The peripheral module is electrically connected to the electronic device and includes a keyboard or a mouse.

According to an embodiment of the disclosure, the control method further includes: operating the first group under an optimal setting, setting 30% to 50% of the optimal setting as an initial ratio, operating the second group at a plurality of ratios with arithmetic increases from the initial ratio, and measuring a plurality of antenna efficiencies of the second group operating at the ratios to choose an optimized ratio from the ratios; and operating the second group at the optimized ratio.

According to an embodiment of the disclosure, the control method further includes: operating the first group at a default ratio, operating the second group at a plurality of ratios with arithmetic decreases from the default ratio, and measuring a plurality of antenna efficiencies of the second group operating at the ratios to choose an optimized ratio from the ratios, the default ratio being 70% to 100%; and operating the second group at the optimized ratio.

Based on the above, in the control method of the multi-antenna module according to the embodiments of the disclosure, by detecting the performance of the antennas in the first frequency band and the second frequency band, the antennas are divided into the first group whose performance is better in the first frequency band than in the second frequency band and the second group other than the first group. Then, the first group is instructed to generate signals in the first frequency band, and the second group is instructed to generate signals in the second frequency band. In this way, the control method of the multi-antenna module according to the embodiments of the disclosure is able to ensure that the antennas have favorable performance in the first frequency band. In addition, since the contribution of the second group to the first frequency band is limited, the increase in antenna efficiency through generating signals in the first frequency band by using the second group is limited. In the control method of the multi-antenna module according to the embodiments of the disclosure, the second group is used to generate signals in the second frequency band. Thus, the antennas may operate in multiple frequency bands.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Figure 1:
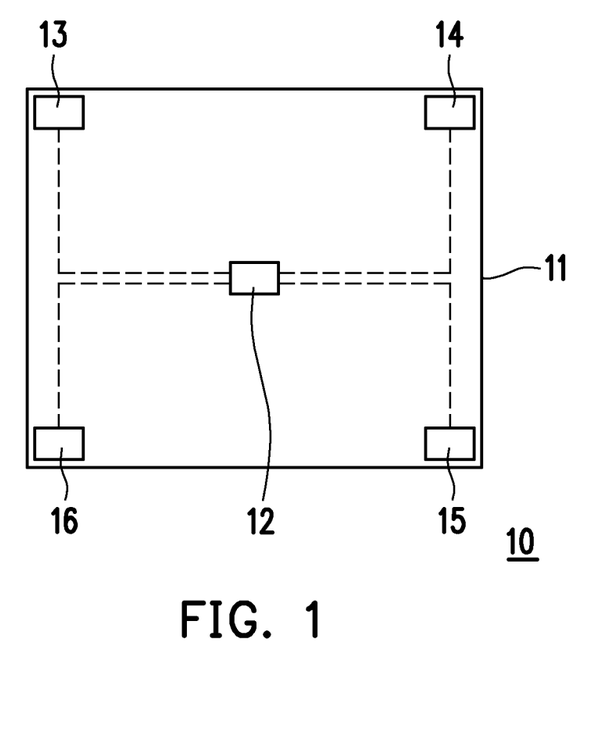
FIG. 1 is a schematic view of an electronic device according to an embodiment of the disclosure.

FIG. 1 is a schematic view of an electronic device according to an embodiment of the disclosure. Referring to FIG. 1, in the embodiment, an electronic device 10 is a laptop computer, a tablet computer, a cell phone, or other devices, for example. The electronic device of the embodiment includes a casing 11, an antenna control assembly 12 located in the casing 11, and a plurality of antennas 13, 14, 15, and 16 located in the casing 11. The antennas 13, 14, 15, and 16 are electrically connected with the antenna control assembly 12. In the embodiment, since the antennas 13, 14, 15, and 16 are located inside the casing 11, these antennas may be regarded as internal antennas.

In addition, while the number of the antennas 13, 14, 15, and 16 is 4, such number is merely an example, and the disclosure is not limited thereto. In other embodiments, there may also be six, eight or even more antennas. In the embodiment, the antennas 13, 14, 15, and 16 are respectively disposed at four corners of the casing 11 to receive signals from different directions and thereby enhance signal reception and transmission of antennas. Of course, the positions where the antennas 13, 14, 15, and 16 are located are not limited thereto.

Since a portion of the casing 11 of the electronic device 10 may be metallic, the antennas 13, 14, 15, and 16 may be shielded by metal and are unable to operate at expected efficiency. In the embodiment, the antenna control assembly 12 may respectively detect the reception and transmission states of the antennas 13, 14, 15, and 16, and make adjustment accordingly to the optimal antenna setting.

The electronic device 10 may detect, through the antenna control assembly 12, usages, noise statuses, signal strengths (e.g., received signal strength intensity, RSSI) and signal-to-noise ratios (SNR) of the antennas 13, 14, 15, and 16. In addition, the electronic device 10 may correspondingly control the antennas 13, 14, 15, and 16 according to the CPU status thereof (usage or efficiency), the memory status thereof (usage or efficiency), the temperature, voltage, current, power consumption, frequency, etc., of the respective internal components thereof, the status of the storage device thereof, and the status of the power supply thereof.

In the embodiment, based on the control method described in the following, the antennas 13, 14, 15, and 16 may operate in multiple frequency bands and render favorable antenna efficiency. It should be noted that, while the following embodiment describes four antennas, such number of the antennas merely serves as an example and shall not be construed as a limitation on the disclosure.

Figure 2:
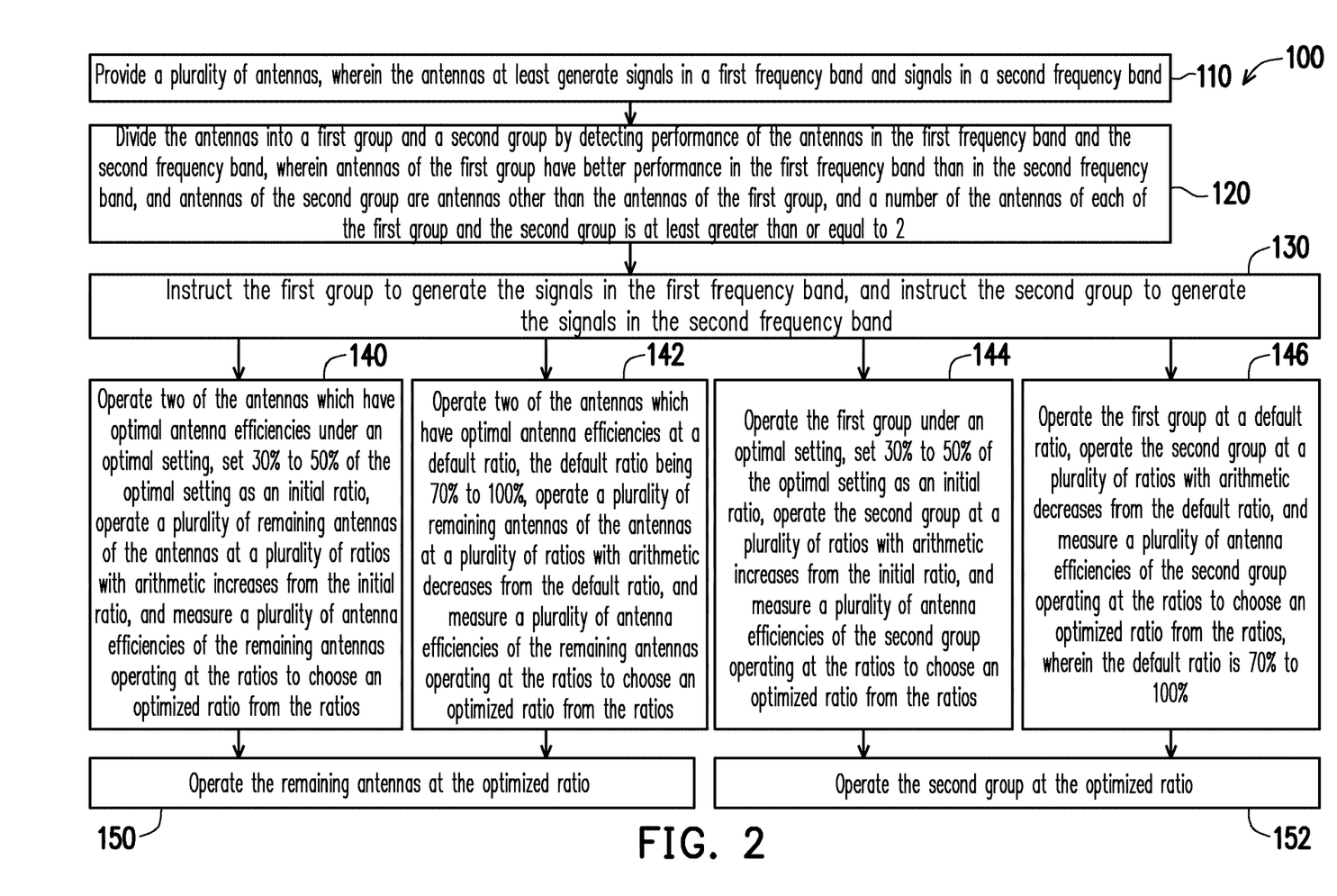
FIG. 2 is a schematic flowchart illustrating a control method of a multi-antenna module according to an embodiment of the disclosure.

FIG. 2 is a schematic flowchart illustrating a control method of a multi-antenna module according to an embodiment of the disclosure. Referring to FIG. 2, a control method 100 of a multi-antenna module according to the embodiment includes the following.

Firstly, in Step 110, a plurality of antennas are provided. The antennas at least generate signals in a first frequency band and a second frequency band. In the embodiment, the first frequency band and the second frequency band may be different frequency bands of 4G signals, such as any two of FDD-LTE Band 1 (2100 MHz), FDD-LTE Band 3(1800 MHz), FDD-LTE Band 7(2600 MHz), FDD-LTE Band 8(900 MHZ), FDD-LTE Band 28(700 MHZ), and TD-LTE Band 38(2600 MHZ). Of course, the first frequency band and the second frequency band are not limited thereto. In other embodiments, the first frequency band and the second frequency band may also be different frequency bands of signals of WIFI, BT, 5G, etc.

Then, in Step 120, the antennas are divided into a first group and a second group by detecting the performance of the antennas in the first frequency band and the second frequency band. The performance of the antennas of the first group is better in the first frequency band than in the second frequency band. The antennas of the second group are antennas other than the antennas of the first group. The number of the antennas in each of the first group and the second group is at least greater than or equal to 2. In the disclosure, the performance of an antenna in a frequency band refers to the signal transmission strength of the antenna in the frequency band.

For example, in the embodiment, two of the antennas have better performance in the first frequency band than in the second frequency band, whereas the other two of the antennas have better performance in the second frequency band than the first frequency band. In such situation, the two antennas having better performance in the first frequency band are classified into the first group, whereas the two antennas having better performance in the second frequency band are classified into the second group. Of course, in an embodiment, it is also possible to choose two of the four antennas whose performance is better in the first frequency band than in the second frequency band as the first group, and classify the rest of the antennas into the second group.

Then, in Step 130, the first group is instructed to generate signals in the first frequency band, and the second group is instructed to generate signals in the second frequency band. Since the first group performs better in the first frequency band, instructing the first group to generate signals in the first frequency band ensures that the antennas operate favorably in the first frequency band. Meanwhile, since the contribution of the second group in the first frequency band is limited, the increase in antenna efficiency through generating signals in the first frequency band by using the second group is limited. Specifically, since the second group may exhibit better performance in the second frequency band, through generating signals in the second frequency band by using the second group according to the control method 100 of the multi-antenna module, the antennas are able to use multiple frequency bands simultaneously and exhibit favorable antenna efficiency in the first frequency band and the second frequency band. In the disclosure, the antenna efficiency refers to the signal transmission power (i.e., the power for uploading data). The unit thereof may be dBm, which is a value representing an absolute value of power, or a ratio (%) based on the power of 1 mW. The greater the value or ratio, the higher the signal transmission power, and therefore the better the antenna efficiency.

Meanwhile, in an embodiment, the control method of the multi-antenna module may optionally further include Step 140, in which two of the antennas having the optimal antenna efficiency operate under an optimal setting. In addition, 30% to 50% of the optimal setting is set as an initial ratio, a plurality of remaining antennas of the antennas operate at a plurality of ratios with arithmetic increases from the initial ratio, and a plurality of antenna efficiencies of the remaining antennas operating at the ratios are measured to choose an optimized ratio from the ratios.

Specifically, due to the difference among the positions of the antennas, the antennas in different orientations may have different antenna efficiencies. For optimization, in the control method of the multi-antenna module according to the embodiment, two antennas with optimal antenna efficiencies may be chosen, and the two antennas operate at the optimal setting (e.g., 100%). In the disclosure, the optimal setting means that the multi-antenna module may detect and determine the antenna efficiencies of multiple frequency bands (e.g., 4G, WIFI, BT, or 5G) provided by a service provider and set the antenna to the frequency band with the optimal antenna efficiency.

In addition, other antennas may operate by using 30% to 50% of the optimal setting as the initial ratio and gradually increasing at an interval of 1% to 10%, and measuring the antenna efficiencies of the antennas. For example, other antennas may be set with an initial ratio of 30% of the optimal setting, and the ratio gradually increases at an interval of 5% to test the antenna efficiencies of the antennas under the conditions of 30%, 35%, 40%, 45%, 50%, etc., of the optimal setting.

Then, the antenna efficiencies corresponding to the ratios from a smaller value to a greater value are compared. When the increase of one of the antenna efficiencies from the previous one is less than a default value (e.g., 0.5 dBm) of a default ratio (e.g., 5%), the increase in antenna efficiency is considered to be limited. Therefore, the ratio corresponding to the one of the antenna efficiencies is set as the optimized ratio, so as to reduce energy consumption.

Then, at Step 150, the remaining antennas (i.e., the remaining antennas other than the two antennas with the optimal antenna efficiencies) operate at the optimized ratio.

In another embodiment, the control method of the multi-antenna module may optionally further include Step 142, in which two of the antennas with the optimal antenna efficiencies operate at a default ratio, the default ratio being 70% to 100%. In addition, a plurality of remaining antennas of the antennas operate at a plurality of ratios with arithmetic decreases from the default ratio, and a plurality of antenna efficiencies when the remaining antennas operate at the ratios are measured to choose an optimized ratio from the ratios. The remaining antennas operate at the optimized ratio.

Specifically, in the control method of the multi-antenna module according to the embodiment, two of the antennas with optimal antenna efficiencies are chosen, and the two antenna operate at the default ratio (e.g., 80%).

In addition, other antennas may operate at ratios which gradually decrease at an interval of 1% to 10% from the default ratio (e.g., 70% to 100%), and a plurality of antenna efficiencies when other antennas operate at the ratios are measured. For example, other antennas may be initially set at 80% as the default ratio, and the ratio gradually decreases at an interval of 5% to test the antenna efficiencies of these antennas under the conditions of 80%, 75%, 70%, 65%, 60%, etc.

Then, the antenna efficiencies corresponding to the ratios from a greater value to a smaller value are compared. When the decrease of one of the antenna efficiencies from the previous one is greater than a default value (e.g., 0.5 dBm) or a default ratio (e.g., 5%), the ratio corresponding to the one of the antenna efficiencies is set as the optimized ratio, so as to reduce power consumption.

Then, at Step 150, the remaining antennas (i.e., the remaining antennas other than the two antennas with the optimal antenna efficiencies) operate at the optimized ratio.

In yet another embodiment, the control method of the multi-antenna module may optionally further include Step 144, in which the first group operates under the optimal setting. In addition, 30% to 50% of the optimal setting is set as an initial ratio, and the second group operates at a plurality of ratios with arithmetic increases from the initial ratio. Also, a plurality of antenna efficiencies of the second group operating at the ratios are measured to choose an optimized ratio from the ratios. Then, in Step 152, the second group operates at the optimized ratio.

In the embodiment, the first frequency band serves as the primary frequency band, and the antennas serving to generate signals in the first frequency band operate under the optimal setting. The second frequency band serves as the secondary frequency band, and the operational setting is adjusted under the premise of reducing power consumption.

In still another embodiment, the control method of the multi-antenna module may optionally further include Step 146, in which the first group operates at the default ratio. In addition, the second group operates at a plurality of ratios with arithmetic decreases from the default ratio, and a plurality of antenna efficiencies of the second group operating at the ratios are measured to choose an optimized ratio from the ratios. The default ratio is 70% to 100%. Then, in Step 152, the second group operates at the optimized ratio. Similarly, in the embodiment, the first frequency band serves as the primary frequency band, and the antennas serving to generate signals in the first frequency band operate at the default ratio which is higher. The second frequency band serves as the secondary frequency band, and the operational setting is adjusted under the premise of reducing power consumption.

Figure 3:
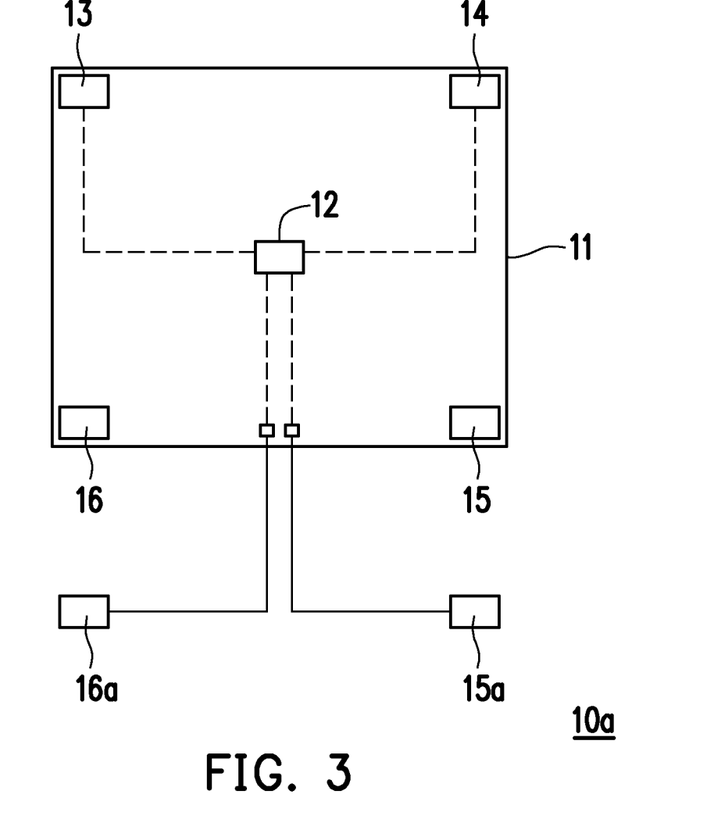
FIG. 3 is a schematic view of an electronic device according to another embodiment of the disclosure.

FIG. 3 is a schematic view of an electronic device according to another embodiment of the disclosure. Referring to FIG. 3, an electronic device 10a according to the embodiment includes the four antennas 13, 14, 15, and 16 located in the casing 11 and two antennas 15a and 16a located outside the casing 11. The antennas 13, 14, 15, 16, 15a, and 16a are electrically connected with the antenna control assembly 12. In the embodiment, the antennas 13, 14, 15, and 16 located inside the casing 11 may be regarded as internal antennas. The antennas 15a and 16a located outside the casing 11 may be regarded as external antennas. Of course, the number and the arrangement of the antennas are not limited thereto. In other embodiments, the electronic device 10a may also include 8 or a different number of antennas.

For the multi-antenna module having internal antennas and external antennas, the electronic device 10a may detect signal usage, signal strength, noise strength, and temperature, and be used with a recognition system to determine whether a person or an object is approaching, so as to automatically adjust the transmission and reception of antenna strength signals. The system may individually adjust the signal strength as well as idling or operational of each of the antennas 13, 14, 15, 16, 15a, and 15b and switch among functions such as 3G, 4G, 5G, etc., of the antennas 13, 14, 15, 16, 15a, and 15b and may also detect information such as usage, noise status, signal strength RSSI, and signal-to-noise ratio (SNR), etc. In the following, a control method 100a of the multi-antenna module is provided in the following.

Figure 4:
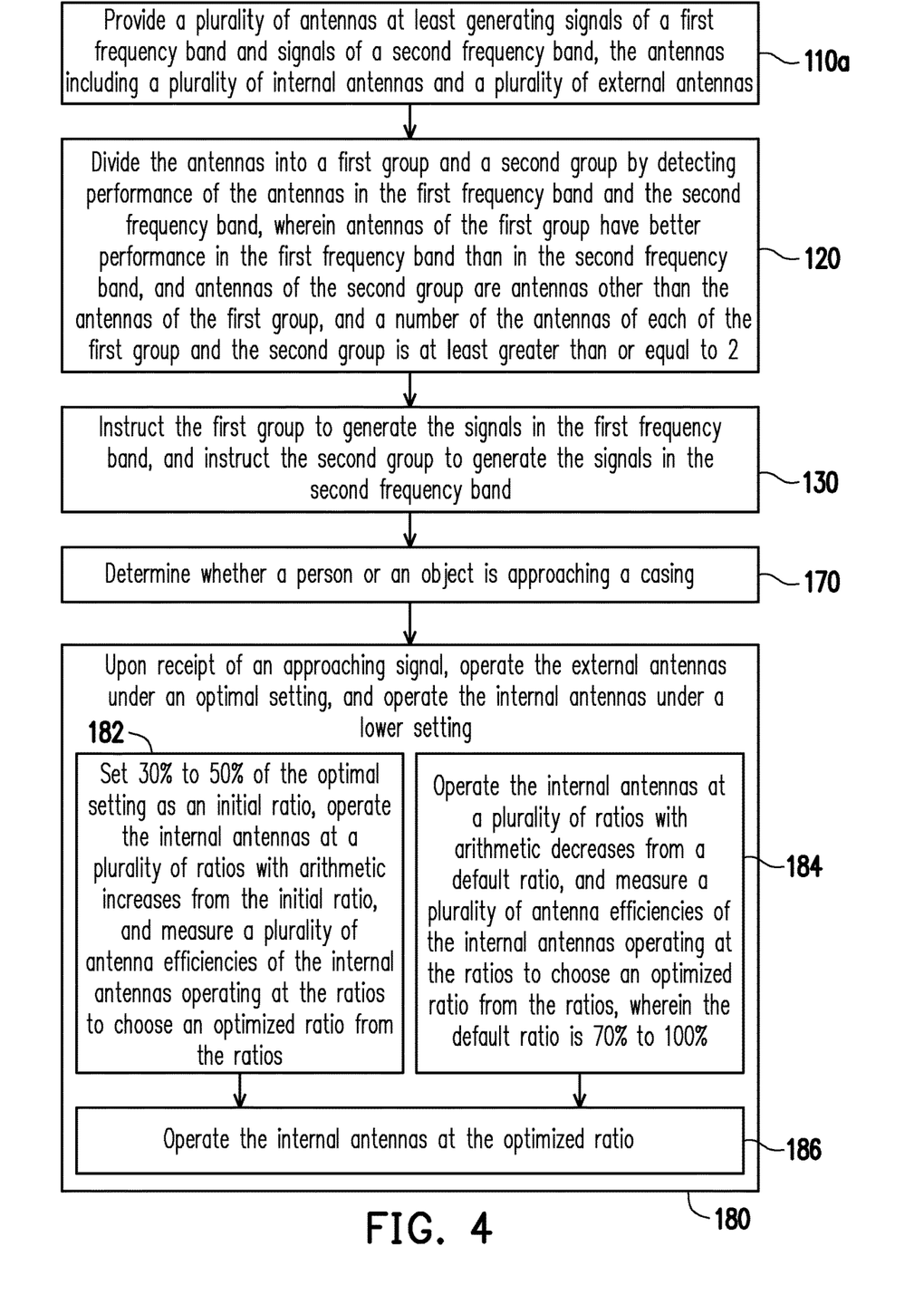
FIG. 4 is a schematic flowchart illustrating a control method of a multi-antenna module according to another embodiment of the disclosure.

FIG. 4 is a schematic flowchart illustrating a control method of a multi-antenna module according to another embodiment of the disclosure. Referring to FIG. 4, in Step 110a, a plurality of antennas are provided. The antennas at least generate signals in a first frequency band and a second frequency band. In addition, the antennas include a plurality of internal antennas and a plurality of external antennas. In the embodiment, the first frequency band and the second frequency band may be different frequency bands of 4G signals, such as any two of FDD-LTE Band 1 (2100 MHz), FDD-LTE Band 3(1800 MHz), FDD-LTE Band 7(2600 MHz), FDD-LTE Band 8(900 MHZ), FDD-LTE Band 28(700 MHZ), and TD-LTE Band 38(2600 MHZ). Of course, the first frequency band and the second frequency band are not limited thereto. In other embodiments, the first frequency band and the second frequency band may also be different frequency bands of signals of WIFI, BT, 5G, etc.

Then, in Step 120, the antennas are divided into a first group and a second group by detecting the performance of the antennas in the first frequency band and the second frequency band. The performance of the antennas of the first group is better in the first frequency band than in the second frequency band. The antennas of the second group are antennas other than the antennas of the first group. The number of the antennas in each of the first group and the second group is at least greater than or equal to 2. Then, in Step 130, the first group is instructed to generate signals in the first frequency band, and the second group is instructed to generate signals in the second frequency band.

In the embodiment, the control method of the multi-antenna module further includes Step 170, in which whether a person or an object is approaching is determined. Regarding the process of determining whether a person or an object is approaching, the antenna control assembly 12 in the casing 11 further includes a detection module (not shown), and the detection module includes, for example, at least one of an optical detection module, a sound reception module, a distance detection module, and a peripheral module to detect whether a person or an object is approaching the casing.

Specifically, the optical detection module includes a face recognition system or an infrared module, and may optically detect whether a person or an object is approaching. The sound reception module includes a microphone and may detect whether a sound is received. The distance detection module includes an ultrasonic detection module and may detect whether the distance with respect to an object or a person in the surrounding changes. The peripheral module is electrically connected to the electronic device and includes a keyboard or a mouse. The system may determine whether a person is approaching according to whether there is an input signal.

Then, in Step 180, the antenna control assembly 12 in the casing 11 further includes a detection chip (not shown), such as a computing component like an SOC or MCU. When detecting that a person or an object is approaching, the detection module may transmit an approaching signal to the detection chip, and the detection chip may make a determination and respectively control the operations of the antennas to operate the external antennas under the optimal setting and operate the internal antennas under a lower setting. By operating the internal antennas under a lower setting (i.e., a lower signal transmission power), the influences of electromagnetic waves on human bodies within a short distance may be alleviated. By operating the external antennas under the optimal setting, the stability and settings such as the transmission speed at the original high rate may be maintained.

In an embodiment, the process of operating the internal antennas under a lower setting includes Step 182, in which 30% to 50% of the optimal setting is set as an initial ratio, and the internal antennas operate at a plurality of ratios with arithmetic increases from the initial ratio, and a plurality of antenna efficiencies of the internal antennas operating at the ratios are measured to choose an optimized ratio from the ratios. Then, in Step 186, the internal antennas operate at the optimized ratio.

In another embodiment, the process of operating the internal antennas under a lower setting includes Step 184, in which the internal antennas operate at a plurality of ratios with arithmetic decreases from a default ratio, and a plurality of antenna efficiencies of the internal antennas operating at the ratios are measured to choose an optimized ratio from the ratios. The default ratio is 70% to 100%. Then, in Step 186, the internal antennas operate at the optimized ratio.

Of course, the way of operating the internal antennas is not limited thereto. In other embodiments, the process of operating the internal antennas under a lower setting may also be operating the internal antennas at 40% to 70% (e.g., 50%) of the optimal setting.

Besides, in an embodiment, the control method of the multi-antenna module may also be carried out by performing Step 170 and Step 180 after Step 110a. Then, Step 120 and 130 are performed. In an embodiment, the control method of the multi-antenna module may be carried out according to FIG. 4. After Step 180, the system may evaluate the performance of the antennas in the first frequency band and the second frequency band again to divide up new first and second groups.

Based on the above, in the control method of the multi-antenna module according to the embodiments of the disclosure, by detecting the performance of the antennas in the first frequency band and the second frequency band, the antennas are divided into the first group, whose performance is better in the first frequency band than in the second frequency band, and the second group other than the first group. Then, the first group is instructed to generate signals in the first frequency band, and the second group is instructed to generate signals in the second frequency band. In this way, the control method of the multi-antenna module according to the embodiments of the disclosure is able to ensure that the antennas have favorable performance in the first frequency band. In addition, since the contribution of the second group to the first frequency band is limited, the increase in antenna efficiency through generating signals in the first frequency band by using the second group is limited. In the control method of the multi-antenna module according to the embodiments of the disclosure, the second group is used to generate signals in the second frequency band. Thus, the antennas may operate in multiple frequency bands.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A control method of a multi-antenna module, the control method comprising:
   providing a plurality of antennas, wherein the antennas at least generate signals in a first frequency band and signals in a second frequency band;
   dividing the antennas into a first group and a second group by detecting performance of the antennas in the first frequency band and the second frequency band, wherein antennas of the first group have better performance in the first frequency band than in the second frequency band, and antennas of the second group are antennas other than the antennas of the first group, and a number of the antennas of each of the first group and the second group is at least greater than or equal to 2;
   instructing the first group to generate the signals in the first frequency band, and instructing the second group to generate the signals in the second frequency band;
   operating, under an optimal setting, two of the antennas which have optimal antenna efficiencies, setting 30% to 50% of the optimal setting as an initial ratio, operating a plurality of remaining antennas of the antennas at a plurality of ratios with arithmetic increases from the initial ratio, and measuring a plurality of antenna efficiencies of the remaining antennas operating at the ratios to choose an optimized ratio from the ratios; and
   operating the remaining antennas at the optimized ratio.

2. The control method as claimed in claim 1, wherein choosing the optimized ratio from the ratios comprises:
   comparing the antenna efficiencies corresponding to the ratios from a smaller value to a greater value, wherein when an increase of one of the antenna efficiencies from a previous one is less than a default value, the ratio corresponding to the one of the antenna efficiencies is set as the optimized ratio.

3. The control method as claimed in claim 1, wherein the antennas are located in a casing of an electronic device and serve as a plurality of internal antennas, and the internal antennas are located at a plurality of corners in the casing.

4. The control method as claimed in claim 3, further comprising:
   providing a plurality of external antennas, located outside the casing and at least generating signals in the first frequency band and signals of the second frequency band;
   determining whether a person or an object is approaching the casing; and
   upon receipt of an approaching signal, operating the external antennas under an optimal setting, and operating the internal antennas under a lower setting.

5. The control method as claimed in claim 4, wherein operating the internal antennas under the lower setting comprises:
   setting 30% to 50% of the optimal setting as an initial ratio, operating the internal antennas at a plurality of ratios with arithmetic increases from the initial ratio, and measuring a plurality of antenna efficiencies of the internal antennas operating at the ratios to choose an optimized ratio from the ratios; and
   operating the internal antennas at the optimized ratio.

6. The control method as claimed in claim 4, wherein operating the internal antennas under the lower setting comprises:
   operating the internal antennas at a plurality of ratios with arithmetic decreases from a default ratio, and measuring a plurality of antenna efficiencies of the internal antennas operating at the ratios to choose an optimized ratio from the ratios, wherein the default ratio is 70% to 100%; and
   operating the internal antennas at the optimized ratio.

7. The control method as claimed in claim 4, wherein determining whether the person or the object is approaching the casing comprises:
   detecting whether the person or the object is approaching the casing by using at least one of an optical detection module, a sound reception module, a distance detection module, and a peripheral module, wherein the optical detection module comprises a human face recognition system or an infrared module, the sound reception module comprises a microphone, the distance detection module comprises an ultrasonic detection module, and the peripheral module is electrically connected to the electronic device and comprises a keyboard or a mouse.

8. A control method of a multi-antenna module, the control method comprising:
   providing a plurality of antennas, wherein the antennas at least generate signals in a first frequency band and signals in a second frequency band;
   dividing the antennas into a first group and a second group by detecting performance of the antennas in the first frequency band and the second frequency band, wherein antennas of the first group have better performance in the first frequency band than in the second frequency band, and antennas of the second group are antennas other than the antennas of the first group, and a number of the antennas of each of the first group and the second group is at least greater than or equal to 2;
   instructing the first group to generate the signals in the first frequency band, and instructing the second group to generate the signals in the second frequency band;
   operating, at a default ratio, two of the antennas which have optimal antenna efficiencies, the default ratio being 70% to 100%, operating a plurality of remaining antennas of the antennas at a plurality of ratios with arithmetic decreases from the default ratio, and measuring a plurality of antenna efficiencies of the remaining antennas operating at the ratios to choose an optimized ratio from the ratios; and operating the remaining antennas at the optimized ratio.

9. The control method as claimed in claim 8, wherein choosing the optimized ratio from the ratios comprises:

comparing the antenna efficiencies corresponding to the ratios from a greater value to a smaller value, wherein when a decrease of one of the antenna efficiencies from a previous one is greater than a default value, the ratio corresponding to the one of the antenna efficiencies is set as the optimized ratio.

10. A control method of a multi-antenna module, the control method comprising:

providing a plurality of antennas, wherein the antennas at least generate signals in a first frequency band and signals in a second frequency band;

dividing the antennas into a first group and a second group by detecting performance of the antennas in the first frequency band and the second frequency band, wherein antennas of the first group have better performance in the first frequency band than in the second frequency band, and antennas of the second group are antennas other than the antennas of the first group, and a number of the antennas of each of the first group and the second group is at least greater than or equal to 2;

instructing the first group to generate the signals in the first frequency band, and instructing the second group to generate the signals in the second frequency band;

operating the first group under an optimal setting, setting 30% to 50% of the optimal setting as an initial ratio, and operating the second group at a plurality of ratios with arithmetic increases from the initial ratio, or operating the first group at a default ratio, and operating the second group at a plurality of ratios with arithmetic decreases from the default ratio, wherein the default ratio is 70% to 100%;

measuring a plurality of antenna efficiencies of the second group operating at the ratios to choose an optimized ratio from the ratios; and operating the second group at the optimized ratio.

* * * * *